United States Patent [19]

Flora et al.

[11] Patent Number: 4,722,085
[45] Date of Patent: Jan. 26, 1988

[54] HIGH CAPACITY DISK STORAGE SYSTEM HAVING UNUSUALLY HIGH FAULT TOLERANCE LEVEL AND BANDPASS

[75] Inventors: Laurence P. Flora, Covina; Gary V. Ruby, Pasadena, both of Calif.

[73] Assignee: Unisys Corp., Detroit, Mich.

[21] Appl. No.: 825,174

[22] Filed: Feb. 3, 1986

[51] Int. Cl.⁴ ............................................ G06F 11/00
[52] U.S. Cl. .................................... 371/38; 364/200
[58] Field of Search .................. 371/37, 38, 39, 40, 371/10, 21; 364/200, 900

[56] References Cited

U.S. PATENT DOCUMENTS

| Re. 31,069 | 10/1982 | Chang | 371/10 |
| 4,053,752 | 10/1977 | DeJohn | 371/21 |
| 4,209,809 | 6/1980 | Chang | 371/40 |
| 4,236,207 | 11/1980 | Rado | 364/200 |
| 4,276,647 | 6/1981 | Thacker | 371/40 |
| 4,486,881 | 12/1984 | deCouasnon | 371/40 |
| 4,523,275 | 6/1985 | Swenson | 364/200 |
| 4,562,577 | 12/1985 | Glouer | 371/38 |
| 4,598,357 | 7/1986 | Swenson | 371/10 |
| 4,612,613 | 9/1986 | Gershenson | 364/200 |
| 4,622,598 | 11/1986 | Doi | 371/39 |

*Primary Examiner*—Michael R. Fleming
*Attorney, Agent, or Firm*—Nathan Cass; Kevin R. Peterson; Edmund M. Chung

[57] ABSTRACT

A relatively large plurality of relatively small, independently operating disk subsystems are coupled to a read/write interface containing error circuitry and data organizer circuitry. The data organizer circuitry organizes read/write data for read/write communication with the disk subsystems via the error circuitry such that the overall system appears as a large, high capacity disk system having an unusually high fault tolerance and a very high bandpass.

17 Claims, 4 Drawing Figures

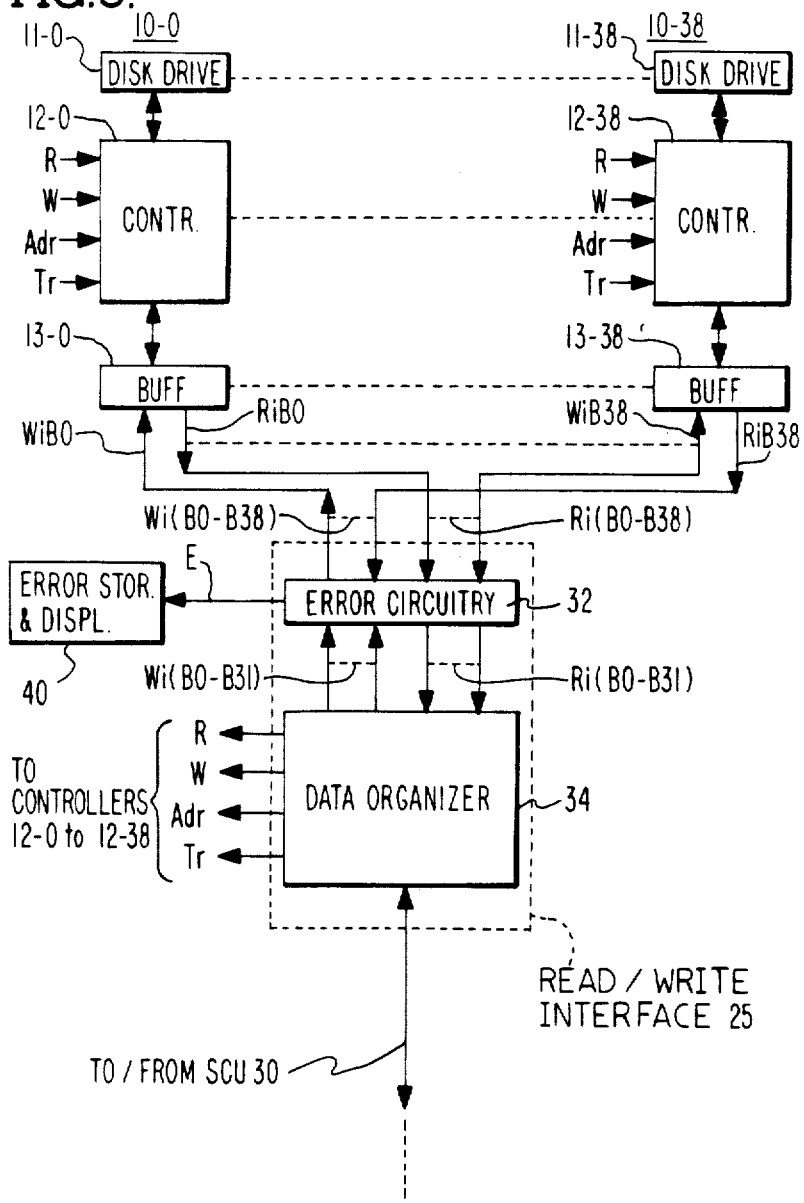

HIGH CAPACITY DISK STORAGE SYSTEM HAVING UNUSUALLY HIGH FAULT TOLERANCE LEVEL AND BANDPASS

BACKGROUND OF THE INVENTION

The present invention generally relates to improved means and methods for providing highly reliable peripheral storage for use in a data processing system, and more particularly to a high capacity disk storage system comprised of a plurality of disk drives electrically coupled together in a manner so as to function as a high capacity disk drive having an unusually high fault tolerance level as well as a very high bandpass.

In present day computer systems, the reliability of the peripheral storage system employed therewith is a critical item affecting overall system reliability, particularly where disk drives (today's favored peripheral storage devices) are used for peripheral storage. The primary reason is that the reliability of modern CPUs (computer processing units) has easily outstripped the reliability of the disk systems with which they are employed despite the intensive activity in recent years to improve the reliability of these disk systems.

The imbalance between the reliability of CPUs and disk systems has led to the development of data-base systems with audit trails which make it possible to reconstruct a data base after the failure and repair of the disk system.

Also, a so-called "mirrored disk" approach is typically used in which all data is written to two disk drives simultaneously, allowing easy recovery if one of them fails.

Known approaches (such as those mentioned above) for protecting the integrity of data in the event of disk failure are expensive either in direct equipment cost and/or in system performance. What is vitally needed, therefore, is a new approach for significantly increasing the reliability (fault tolerance) of a disk storage system which will not require the considerable expense and complexity of presently known approaches.

SUMMARY AND OBJECTS OF THE INVENTION

Accordingly, a broad object of the present invention is to provide improved means and methods for achieving a highly reliable, high capacity peripheral storage system which does not require the considerable expense and complexity of presently known approaches.

A more specific object of the invention is to provide an economical, highly reliable, high capacity disk storage system which is able to take advantage of the economies and other advantages characteristic of relatively small disk drives.

A further object of the invention is to provide a high capacity disk storage system having an unusually high level of fault tolerance.

An additional object of the invention in accordance with one or more of the foregoing objects is to provide a high capacity disk storage system having a very high bandpass.

The above objects are accomplished in a particular preferred embodiment of the invention by employing a relatively large plurality of relatively small disk drives amongst which data is distributed and with respect to which error detection and correction is provided in a manner such that an unusually high level of fault tolerance is achieved as well as a very high bandpass.

The specific nature of the invention as well as other objects, features, advantages and uses thereof will become evident from the following description of a preferred embodiment taken in conjunction with the accompanying drawings.

BRIEF DESCRIPTION OF THE DRAWINGS

FIG. 3 is a block diagram illustrating in greater detail how the read/write interface 25 of the preferred embodiment illustrated in FIG. 2 is interconnected with the disk subsystems 10-0 to 10-38.

DESCRIPTION OF A PREFERRED EMBODIMENT

Like numbers and characters designate like elements throughout the figures of the drawings.

Initially, it is to be noted that the present invention resides in a novel and unobvious combination which can be implemented using well known apparatus and components. Accordingly, the description of a particular preferred embodiment of the invention will be presented using electrical block diagrams along with accompanying operative descriptions which together will be sufficient to permit those skilled in the art to readily practice the invention.

Figure 1:
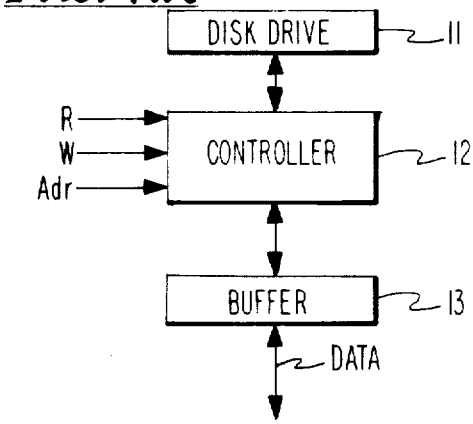
FIG. 1 is a block diagram illustrating a conventional small disk subsystem.

Referring first to FIG. 1, illustrated therein is a conventional, commercially available small disk subsystem 10 comprising a disk drive 11 and an associated disk controller 12 and disk buffer 13. The reliability and performance of such a disk subsystem has been improved significantly in recent years, while the cost has been falling steadily. A typical disk drive subsystem 10 may, for example, comprise a 5¼ inch disk drive providing a storage capacity of 86 megabytes and an access time of 35 milliseconds.

A conventional disk subsystem 10, such as illustrated in FIG. 1, basically operates such that: (1) in response to write and address signals W and Adr applied to the disk controller 12, the controller 12 causes data in the disk buffer 13 to be written to the corresponding addressed disk location, and (2) in response to read and address signals R and Adr, the controller 12 causes data from the corresponding addressed disk location to be read into the disk buffer 13. The typical data size which is addressed on each disk corresponds to a sector of data and comprises, for example, 256 bytes or 2048 bits (a byte being 8 bits). Typically, the buffer 13 provides for storage of one or more sectors of data. The address signals Adr identify the disk track and sector with respect to which reading or writing is to take place.

Figure 2:
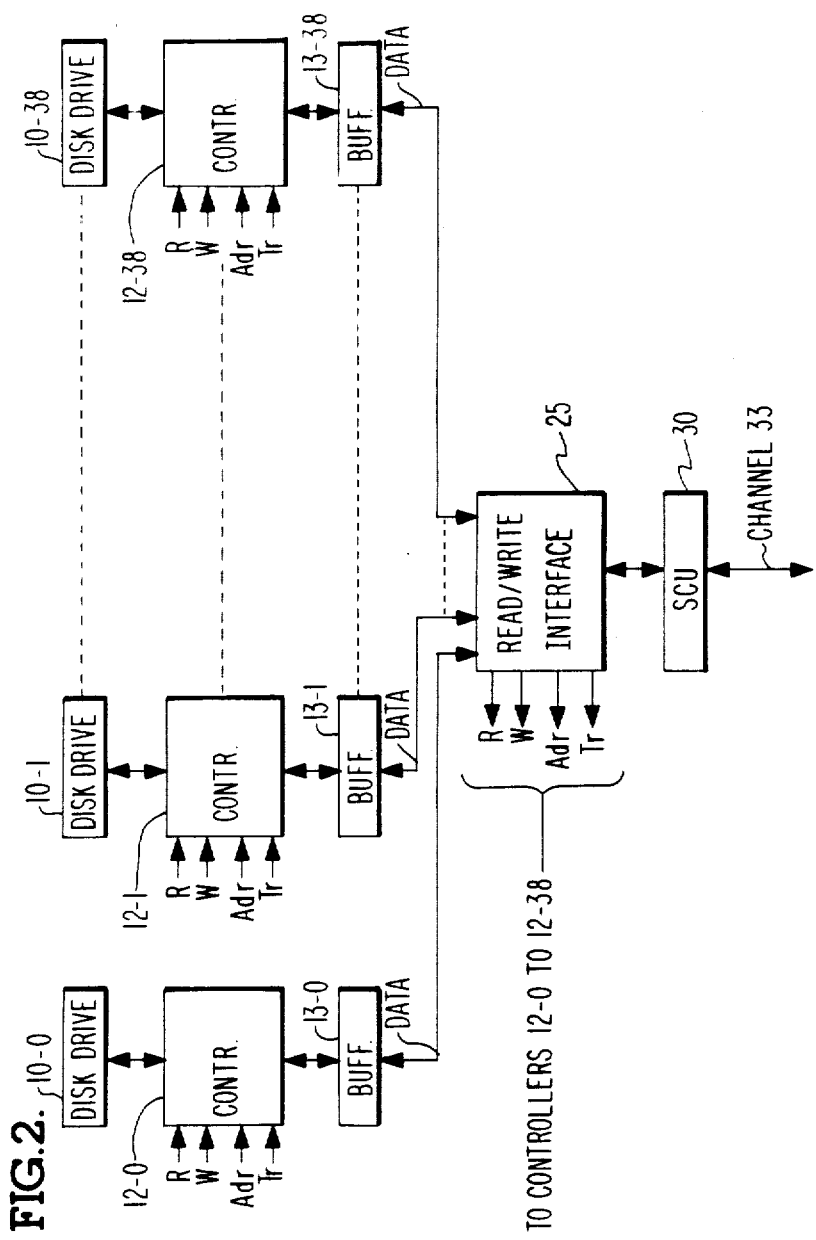
FIG. 2 is a block diagram illustrating a preferred embodiment of the invention.

Reference is next directed to FIG. 2 which illustrates a particular preferred embodiment of the invention in which a relatively large number of the relatively small disk subsystems 10 shown in FIG. 1 are electrically coupled together so as to function as a high capacity disk system having an unusually high level of fault tolerance.

In the particular preferred embodiment of the invention illustrated in FIG. 2, a high capacity disk system is illustrated which employs thirty-nine disk drive subsystems 10-0 to 10-38 of the type shown in FIG. 1. In this preferred embodiment shown in FIG. 2, data is read from or written in parallel to a commonly addressed sector of each disk 11-0 to 11-38, the common address being determined by signals Adr applied in parallel to the controllers 12-0 to 12-38 along with a read R or write W signal as shown. Signal Tr serves as an initiation signal. For a read operation, a sector of data from the addressed sector of each disk is read into its respective buffer 13-0 to 13-38; and for a write operation, a sector of data from each respective buffer 13-0 to 13-38 is written into the addressed sector of its respective disk.

As also shown in FIG. 2, a read/write interface 25 is provided for interfacing the disk subsystems 10-0 to 10-38 to a storage control unit (SCU) 30 which in turn is typically coupled to a computer channel indicated at 33. FIG. 3 illustrates a particular preferred embodiment of this read/write interface 25 and its interconnection to the disk subsystems 10-0 to 10-38.

As shown in FIG. 3, the read/write interface 25 includes error circuitry 32 and a data organizer 34. As will shortly be described in more detail, the error controller 32 serves to provide a high fault tolerance for the high capacity peripheral storage system formed using the disk subsystems 10-0 to 10-38, while the data organizer 34 serves to appropriately organize read and write data for transmission to the circuitry which is to receive the data.

More specifically, the data organizer 34 in FIG. 3 organizes write data received from the SCU 30 so that the data is appropriately organized for distribution (via error circuitry 32) to the buffers 13-0 to 13-38 (FIG. 2) of the disk subsystems 10-0 to 10-38; and organizes read data received from the buffers 13-0 to 13-38 of the disk subsystems 10-0 to 10-38 (via error circuitry 32) so that the data is appropriately organized for distribution to the SCU 30. The data organizer 34 also responds to data received from the SCU 30 to provide appropriate sector address and transfer signals Adr and Tr and read and write signals R and W for application in parallel to the disk controllers 12-0 to 12-38 (FIG. 2).

The specific manner in which the error circuitry 32 provides a high fault tolerance for the high capacity peripheral storage system formed from the disk subsystems 10-0 to 10-38 will now be explained by considering typical read and write operations for the illustrated preferred embodiment.

Figure 4:
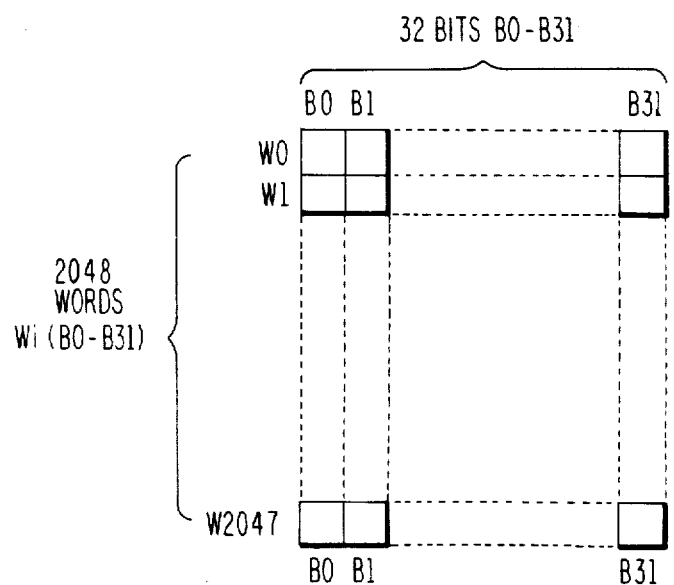
FIG. 4 is a schematic diagram illustrating how data is organized by the data organizer 34 in FIG. 3.

Write operations will be considered first. In the particular preferred embodiment being described, the basic segment of write data transmitted to the data organizer 34 in FIG. 3 by the SCU 30 is chosen to correspond to 32 disk sectors, a sector typically being comprised of 256 bytes or 2048 bits as noted previously. The data organizer 34 organizes this basic segment of data into 2048 words W0–W2047, each word being comprised of 32 bits B0–B31, as schematically illustrated in FIG. 4. The data organizer 34 feeds these 2048 32-bit words W0–W2047 one word at a time (i.e., serially) to error circuitry 32 which adds seven additional error check bits B32–B38 to each 32-bit word in a conventional manner to thereby produce a resultant 39-bit word at its output having error checking and correction capability. These 2048 serially applied, 32-bit words fed to error circuitry 32 are indicated in FIG. 3 by Wi(B0–B31), and the 2048 serially produced 39-bit words produced at the output of the error circuitry 32 are indicated by Wi(B0–B38) where "i" has values from 0 to 2047 respectively corresponding to the 2048 words W0 to W2047. It will be understood that the generation of error check bits and their use for error detection and correction are well known in the art and can readily be implemented. Further information in this regard can be found, for example, in the article by R. W. Hamming, "Error Detecting and Error Correcting Codes", Bell Systems Technical Journal, 29, 1950, pp. 147–160 and in U.S. Pat. Nos. 4,375,664; 4,168,486; and 4,052,698.

Still with reference to FIG. 3, the 39 bits B0–B38 of each of the 2048 words Wi (B0–B38) serially produced at the output of the error circuitry 32 are respectively applied to the buffers 13-0 to 13-38 of the 39 disk drive subsystems 10-0 to 10-38. For example, as shown in FIG. 3, buffer 13-0 receives the 2048 B0 bits WiB0 of the 2048 serially-produced words Wi(B0–B38) and buffer 13-38 receives the 2048 B38 bits WiB38 of Wi(B0–B38). As previously described in connection with FIGS. 1 and 2, these 2048 bits stored in each of the buffers 13-0 to 13-38 are written in parallel into the sectors of the respective disks 10-0 to 10-38 in response to a write signal W, the sector address being determined by the common address signals Adr applied in parallel to the disk controllers 12-0 to 12-38.

Having described how write operations are performed in the preferred embodiment shown in FIG. 3, read operations will next be considered. As previously described in connection with FIGS. 1 and 2, the disks 11-0 to 11-38 are read in response to a read signal R and an address Adr applied in parallel to the disk controllers 12-0 to 12-38 which operate to read the data in the addressed sectors into their respective buffers 13-0 to 13-38. Based on the writing operation described above, it will be understood that, after such reading, each of the buffers 13-0 to 13-38 will contain the 2048 bits corresponding to a respective one of the thirty-nine bits B0 to B38. For example, after reading, buffer 11-0 will contain the 2048 B0 bits RiB0 of words Wi(B0–B38) and the buffer 13-38 will contain the 2048 B38 bits RiB38 of words R0 to R2048.

In the particular preferred embodiment being described, the transfer to the error circuitry 32 of the 2048 39-bit words Ri(B0–B38) read into buffers 13-0 to 13-38 as described above is initiated by the transfer signal Tr applied in parallel to the disk controllers 12-0 to 12-38. This transfer signal Tr is produced at a sufficiently later time following initiation of the reading operation so that adequate time is provided for all of the disks 11-0 to 11-38 to have completed the reading out the data from their addressed sector into their respective buffers 13-0 to 13-38 taking into account worst case conditions. In a similar manner, during the previously described writing operations, adequate time is provided for all of the disks to complete the writing of data into their addressed sector taking into account worst case conditions. As a result, the disk subsystems 10-0 to 10-38 are able to operate independently of one another, since it will not matter what the relative location of the accessing head is to the addressed sector on the various disks during reading and writing. Furthermore, it is important to note that, even when these worst case conditions are taken into account for the reading and writing operations, the bandpass is still very high since reading and writing is performed in parallel with respect to the disk subsystems 10-0 to 10-38.

Continuing with the description of reading operations in the particular preferred embodiment shown in FIG. 3, in response to initiation of transfer operations by the transfer signal Tr, the respective bits read into the buffers 13-0 to 13-38 from the commonly addressed sector (as described above) are applied to the error circuitry 32 as 2048 serially produced 39-bit words Ri(B0-B38), each word containing a respective bit from one of the buffers 13-0 to 13-38. If no error has occurred, these words Ri(B0-B38) will be identical to the words Wi(B0-B38) sent to these buffers from the error circuitry 32 and written at the commonly addressed sector on the disks as previously described.

The error circuitry 32 operates in a conventional manner in response to these serially applied words Ri(B0-B38) to detect errors in each word, and to correct such errors to the extent of its capability. In the particular preferred embodiment being described, it will be assumed that the error circuitry 32 operates in a conventional manner (using the check bits B32 to B38 in each word) to detect and correct a single bit error in each word and to also provide an error output E to error storage and display circuitry 40 for providing a recoverable and/or displayable record indicative of the type, number and bit location of detected errors. As shown in FIG. 3, the resulting corrected 32-bit words Ri(B0-B31,) produced by the error circuitry 32 are applied to the data organizer 34 which appropriately organizes these words for transmission to the SCU 30.

Having described the construction and operation of the particular preferred embodiment of the invention illustrated in FIGS. 1-4, the manner in which a high fault tolerance is achieved for this preferred embodiment will now be explained. It will be understood that, because each of the 39-bit words read from the disks 11-0 to 11-38 and applied to the error circuitry 32 in this preferred embodiment is comprised of one bit from each disk drive, a single error in one of the bits will not cause a fault, since this single bit error will automatically be corrected by the error circuitry 32. Thus, one of the disk subsystems 10-0 to 10-38 could be totally inoperative (or even removed from the system) and still no fault would occur. Furthermore, no recovery routine or transfer of data between disks would be required in order to maintain proper operation. Of course, if error correction were provided for correcting two bits in error, then two of the disk subsystems 10-0 to 10-38 could be inoperative (or absent).

Since error circuitry, such as illustrated by 32 in FIG. 3, typically provides information as to the type and bit location(s) of errors, it is advantageous to apply such error data to conventional storage and display circuitry 40 (as shown in FIG. 3) which can be referred to for preventive maintenance purposes. For example, if it is noted that a disk drive is producing more than a certain number of bit errors, the disk drive could be disconnected from the system and replaced with another disk drive without interfering with normal operation, since the system will not be affected by removal of the disk (assuming, of course, that the total number of correctable bit errors is not exceeded).

Furthermore, it is to be noted that each of the disk subsystems 10-0 to 10-38 typically includes its own burst error checking and correcting circuitry so that the overall fault tolerance of a system in accordance with the present invention can be very high, particularly since smaller disk drives, such as those contemplated for use in a system in accordance with the present invention, have been found to be highly reliable.

Although the present invention has been described in connection with a particular preferred embodiment, it is to be understood that many additions, modifications and variations in construction, arrangement, method and use may be made within the scope of the invention. Accordingly, the invention is to be considered as including all possible modifications, variations and additions coming within the scope of the following claims.

What is claimed is:

1. A high capacity disk storage system comprising:
   a relatively large plurality of independently operable disk subsystems, each disk subsystem comprising disk means containing stored data, wherein data is stored on the disk means of said disk subsystems in the form of data words, each data word comprising a plurality of data digits along with a plurality of associated error check digits, each disk means storing one digit from each data word;
   means coupled to said disk subsystems for reading a data word from the disk means thereof and for producing data word electrical signals corresponding thereto; and
   error circuit means to which said data word electrical signals are applied, said error circuit means being operable to produce electrical signals corresponding to the data digits of a data word read from said disk means, in a manner such that an error in a data digit will be detected and corrected by said error circuit means using the associated error check digits of the data word.

2. The invention in accordance with claim 1, wherein said system includes coupling means for applying to said error circuit means electrical signals corresponding to data digits of a data word to be written on said disk means, wherein said error means is operable in response to these applied electrical signals corresponding to the data digits of a data word to be written to produce electrical signals corresponding to a data word comprised of these data digits and associated error check digits derived therefrom, and wherein said system includes means coupled to said disk subsystems for writing a data word corresponding to these data word electrical signals produced by said error circuit means on said disk means in a manner such that each disk means stores one digit of the written data word.

3. The invention in accordance with claim 2, wherein each digit comprises a binary bit.

4. The invention in accordance with claim 2, including storage control means, and wherein said coupling means is operative to receive data from said storage control means which is to be written on said disk means for organizing this received data into electrical signals corresponding to data digits of a data word for application to said error circuit means.

5. The invention in accordance with claim 4, wherein said coupling means is also operative to receive electrical signals produced by said error circuit means corresponding to data digits of a data word read from said disk means and to transmit electrical signals corresponding thereto to said storage control means.

6. The invention in accordance with claim 2, wherein the digits of a data word are read from said disk means in parallel.

7. The invention in accordance with claim 6, wherein the digits of a data word are written in parallel on said disk means.

8. The invention in accordance with claim 7, wherein the parallel reading and writing of a data word is provided at a common location for all of said disk means.

9. A high capacity disk storage system comprising:

a relatively large plurality of separately operable disk means for storing data; writing means for writing data on said disk means in the form of data words, each data word being comprised of a plurality of data digits and an associated plurality of error check digits chosen so as to permit an error in at least one digit of a data word to be detected and corrected, each disk means storing a respective one of said digits;

reading means for reading data words from said disk means; and error circuit means to which data words read from said disk means are applied, said error circuit means producing output electrical signals corresponding to the data digits of each applied data such that an error in a data digit of an applied data word is corrected.

10. The invention in accordance with claim 9, wherein said reading means and said writing means operate in parallel with respect to said disk means.

11. The invention in accordance with claim 10, including means for applying an address to said reading and writing means which determines the address at which reading or writing is performed on said disk means, said address being common to all of said disk means.

12. A high capacity disk storage system comprising:
a relatively large plurality of separably operable disk subsystems;

each disk subsystem including disk means for storing data, wherein data is stored on the disk means of said subsystems in the form of data words, each data word being comprised of a plurality of data digits and an associated plurality of error check digits chosen so as to permit an error in at least one digit of a data word to be detected and corrected, each disk means storing a respective one of the digits of a data word;

each disk subsystem also including controller means for reading a selectable predetermined plurality of digits from its respective disk means;

each disk subsystem additionally including buffer means for storing digits read from its respective disk means by its respective controller means;

error circuit means operable to receive a data word and to provide error detection and correction therefor using the data error check digits thereof such that electrical signals are outputted by said error circuit means corresponding to the data digits of an applied data word, wherein an error occurring in one of the data digits is corrected; and coupling means coupled to the controller means of said disk subsystems for transferring data digits stored in the buffer means of said subsystems to said error circuit means in the form of data words.

13. A high capacity disk storage system comprising:
a relatively large plurality of separably operable disk subsystems;

each disk subsystem including disk means for storing data, controller means capable of reading data from and writing data on its respective disk means at a selectable address, and buffer means for storing data read from its respective disk means by its respective controller means and for storing data to be written on its respective disk means by its respective controller;

means for storing data words to be written on said disk means in the buffer means of said subsystems, each data word being comprised of data digits and associated error check digits chosen so as to permit the data digits of a data word to be determinable even if there is an error in a digit of the data word, each data word being stored in said buffer means such that each buffer means stores a respective one of the digits thereof;

each controller means being operable in parallel with the other controller means and in response to an applied address to write digits stored in its respective buffer means on its respective disk means at a location determined by said address;

each controller means also being operable in parallel with the other controller means in response to an applied address commonly applied to all of said controller means to read digits from its respective disk means at a location determined by said address and to store the digits read in its respective buffer means;

each controller means further being operable in parallel with the other control means and in response to a transmission signal commonly applied to all of said control means to cause a digit of a data word to be outputted from each buffer so as to thereby form a data word; and error circuit means responsive to a data word outputted from said buffer means for providing electrical output signals corresponding to the data digits thereof, wherein an error in a data digit will have been corrected by said error circuit means using the associated error check digits of the data word.

14. The invention in accordance with claim 13, wherein said controller means is operable in response to said initiation signal to cause said buffer means to successively output a predetermined plurality of data words to said error circuit means.

15. The invention in accordance with claim 14, wherein said initiation signal is provided at a time chosen such that all of the respective digits of each data word to be outputted will have been read into their respective buffer means by their respective controller means.

16. The invention in accordance with claim 13, wherein a common address is applied to all of said controller means for reading and writing.

17. The invention in accordance with claim 13, wherein each disk means includes at least one rotatable disk and cooperating head means; and wherein sufficient time is allowed for the aforesaid reading and writing provided by said controller means to accommodate worst case positioning of the head means relative to the addressed location of their respective disks.

* * * * *